(12) United States Patent
Desai et al.

(10) Patent No.: US 6,915,404 B1
(45) Date of Patent: Jul. 5, 2005

(54) COMPUTER SYSTEM IMPLEMENTING A MULTI-THREADED STRIDE PREDICTION READ AHEAD ALGORITHM

(75) Inventors: Samir Desai, Pune (IN); John Colgrove, Los Altos, CA (US); Ganesh Varadarajan, Pune (IN)

(73) Assignee: VERITAS Operating Corporation, Mountain View, CA (US)

( * ) Notice: Subject to any disclaimer, the term of this patent is extended or adjusted under 35 U.S.C. 154(b) by 0 days.

(21) Appl. No.: 10/883,370

(22) Filed: Jul. 1, 2004

Related U.S. Application Data

(63) Continuation of application No. 10/223,945, filed on Aug. 20, 2002, now Pat. No. 6,789,171.
(60) Provisional application No. 60/384,582, filed on May 31, 2002.

(51) Int. Cl.[7] .............................................. G06F 12/00
(52) U.S. Cl. ...................... 711/204; 711/137; 711/213; 711/217
(58) Field of Search ............................... 711/137, 204, 711/213, 217

(56) References Cited

U.S. PATENT DOCUMENTS

| | | | | |
|---|---|---|---|---|
| 5,357,618 A | * | 10/1994 | Mirza et al. ................... 711/3 |
| 5,822,790 A | * | 10/1998 | Mehrotra .................... 711/213 |
| 6,070,230 A | * | 5/2000 | Capps ........................ 711/137 |
| 6,138,212 A | * | 10/2000 | Chiacchia et al. .......... 711/137 |
| 6,275,918 B1 | * | 8/2001 | Burky et al. ................ 712/225 |
| 6,430,680 B1 | * | 8/2002 | Burky et al. ................ 712/225 |
| 6,571,318 B1 | * | 5/2003 | Sander et al. ............... 711/137 |

* cited by examiner

*Primary Examiner*—Matthew D. Anderson
*Assistant Examiner*—Hetul Patel
(74) *Attorney, Agent, or Firm*—Meyertons Hood Kivlin Kowert & Goetzel, P.C.; B. Noël Kivlin

(57) ABSTRACT

A computer system includes a read ahead engine that receives a sequence of read requests and performs read ahead operations in accordance with various patterns detected within the sequence of read requests. The prefetch engine may implement the method of storing a first run value indicative of the run size of a first plurality of sequential read requests, and storing a first skip value indicative of a non-sequential skip associated with a subsequent read request. The method may further include determining whether a second run value indicative of the sequential run size of a second plurality of read requests equals the first run value, and whether a second skip value indicative of another non-sequential skip associated with an additional read request equals the first skip value. If the first run value equals the second run value, and the first skip value equals the second skip value, a stride pattern is indicated, and one or more read ahead operations according to the detected stride pattern may be initiated.

42 Claims, 6 Drawing Sheets

COMPUTER SYSTEM IMPLEMENTING A MULTI-THREADED STRIDE PREDICTION READ AHEAD ALGORITHM

This application is a continuation of U.S. patent application Ser. No. 10/223,945, entitled "COMPUTER SYSTEM IMPLEMENTING A MULTI-THREADED STRIDE PREDICTION READ AHEAD ALGORITHM", filed Aug. 20, 2002, now U.S. Pat. No 6,789,171, which claims the benefit of U.S. Provisional Application No. 60/384,582, filed May 31, 2002.

BACKGROUND

1. Field of the Invention

Tis invention relates to memory accesses in computer systems, and more particularly to memory read ahead operations within computer systems.

2. Description of the Related Art

Computer systems often include various mechanisms to enhance the speed of processing. Not only is the speed of the processor itself important, but storage performance may be equally important to enhancing the overall processing speed of a computer system. Storage performance may involve accesses to cache memory, main memory, and/or secondary memory such as disk, optical drives, etc.

The expanding gap between processor speed and storage speed has furthered the need to develop techniques designed to reduce or mitigate the amount of time it takes to complete file accesses. One technique known as file prefetching or file read-ahead reduces file access time by transferring data from secondary memory such as a disk to the computer system's main memory before the data is actually requested by an application. If data is correctly prefetched into the computer system's main memory, overall latencies may be reduced since execution of the application need not wait on the transfers to main memory from secondary storage.

Various systems have been proposed that perform operations to prefetch blocks of data in anticipation that the block may be later requested by the application. For example, one simple file read-ahead mechanism prefetches sequential blocks of data based on the assumption that file blocks will be accessed sequentially. While such mechanisms have generally been successful in improving overall performance for applications that regularly perform sequential accesses, overall performance may not be improved (and may in fact be degraded) for applications in which blocks of a file are regularly accessed on a non-sequential basis.

Other mechanisms have therefore been developed that attempt to prefetch data on a non-sequential basis by searching for distinct file usage patterns and exploiting such detected patterns. For example, various stride-based read-ahead mechanisms are known that detect a pattern of regularly spaced, non-sequential accesses and that prefetch blocks of data based upon such strided accesses. A stride-based read-ahead mechanism may, for instance, detect a set of consecutive single block accesses to block locations 3, 5 and then 7 of a given file. When such an access pattern is detected, the mechanism may prefetch block 9 (and possibly additional blocks consistent with the pattern such as blocks 11, 13 and so on). Prefetching on this basis continues until a file request is received that falls outside of the pattern. In this manner, for as long as file requests are performed in accordance with the detected stride pattern, the needed blocks may have already been prefetched into the system's main memory. Accordingly, overall latency in fulfilling a request from the time when it is initiated by an application may be reduced.

Implementations of stride-based read-ahead mechanisms may be somewhat more complicated in multi-threaded systems. In multi-threaded systems, requests from multiple threads may be received in an overlapping fashion by the file system. Thus, although each thread may be performing requests according to a respective, independent stride pattern, when the requests are combined and viewed as a whole, the respective stride pattern of each thread may be obscured. Additionally, the requests of the different threads may interfere with one another in such a manner that a stride pattern may be erroneously detected (i.e., it may appear to the detection mechanism that a thread is performing strided accesses, when in fact, no such strided access pattern is occurring.

Therefore, to correctly identify stride based patters in the requests of differing threads, some systems store a history of file requests to determine which requests correspond to a strided pattern. Such implementations may be somewhat computationally intensive and may require relatively large amounts of storage. Furthermore, such implementations may still be prone to interference between threads.

In addition, while various stride-based read-ahead mechanisms are known that operate upon fixed-size block requests, such mechanisms may not be configured to operate upon requests having variable sizes. Still further, such mechanisms may be incapable of detecting stride patterns formed by a series of sequential accesses, followed by a skip to a non-sequential location, and then another (equal length) series of sequential accesses and an equal skip. In various applications, this form of stride based pattern may be common.

SUMMARY OF THE INVENTION

A computer system and method for implementing a stride prediction read ahead algorithm are disclosed. In one embodiment, a computer system includes a read ahead engine that receives a sequence of read requests and performs read ahead operations in accordance with various patterns detected within the sequence of read requests. The prefetch engine may implement the method of storing a first run value indicative of the run size of a first plurality of sequential read requests, and storing a first skip value indicative of a non-sequential skip associated with a subsequent read request. The method may further include determining whether a second run value indicative of the sequential run size of a second plurality of read requests equals the first run value, and whether a second skip value indicative of another non-sequential skip associated with an additional read request equals the first skip value. If the first run value equals the second run value, and the first skip value equals the second skip value, a stride pattern is indicated, and one or more read ahead operations according to the detected stride pattern may be initiated.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
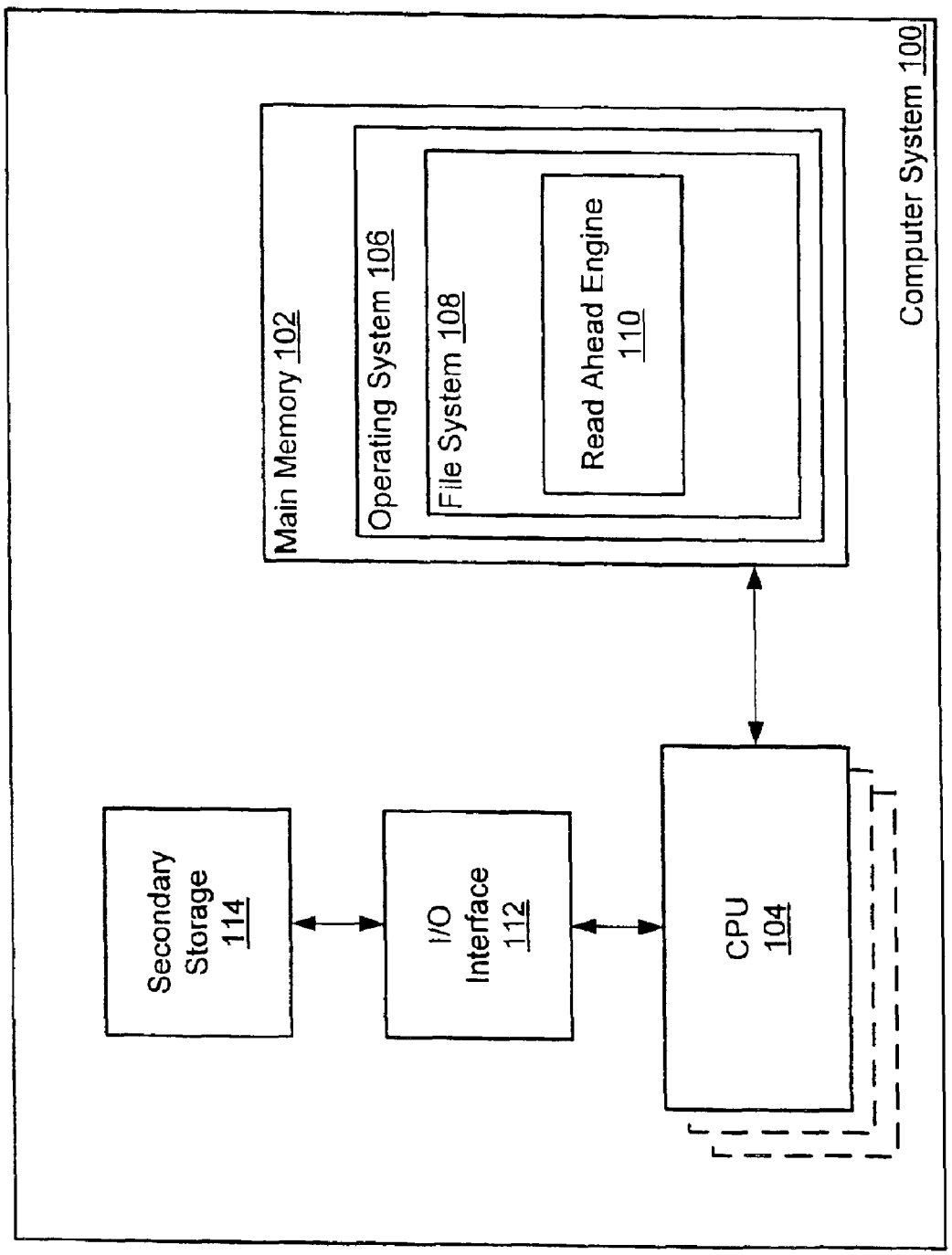
FIG. 1 illustrates a computer system suitable for implementing a stride prediction read ahead algorithm mechanism according to one embodiment.

Turning now to the drawings, FIG. 1 illustrates a computer system 100 configured to perform read ahead operations. Computer system 100 may include various software and hardware components such as a main memory 102, one or more central processing units (CPUs) or processors (illustrated as CPU 104), and an operating system 106. A file system 108 including a read ahead engine 110 is shown as an integral portion of operating system 106. Read ahead engine 110 is configured to perform read ahead operations in accordance with the following description.

Main memory 102 is a memory subsystem for storing instructions and/or data accessible by CPU 104. In one embodiment, main memory 102 is implemented using Dynamic Random Access Memory (DRAM), although it is noted that in other embodiments, other specific types of memory, or combinations thereof, may be utilized.

In different embodiments, computer system 100 may take various forms, including a personal computer system, desktop computer, mainframe computer system, another suitable device, or combinations thereof. In general, the term computer system as used herein is defined to encompass any device having a processor which executes instructions from a memory medium, such as main memory 102. Computer system 100 may be attached to a network as part of a distributed computing environment. In one embodiment, read ahead engine 110 may operate in response to requests initiated by applications executing within computer system 100. In other embodiments, the read ahead engine 110 may operate in response to requests initiated by applications executing on remote systems attached through a network.

As illustrated, computer system 100 also includes an input/output (I/O) interface 112 coupled to a secondary storage 114. I/O interface 112 may additionally interface to various other peripheral I/O, such as network interfaces, modem, etc., as desired. Secondary storage 114 may be formed by any type of storage device such as one or more hard drives, optical storage devices, etc., or any combination thereof. In other embodiments, secondary storage 114 may be accessible by computer system 100 through a network.

Operating system 106 may be configured to provide basic operating system functions such as those provided by Windows NT™ from Microsoft, Inc., Solaris™ from Sun Microsystems, Inc., or any other operating system suitable for computer system 100. Operating system 106 may be configured to run software applications of various types, as desired. As such, operating system 106 may be configured to receive file requests from an application running on computer system 100.

File system 108 is provided within operating system 106 to manage file requests, and may maintain directory information for mapping files to devices such as secondary storage 114. In some implementations, the directory information maintained by file system 108 may include information that maps blocks of files to specific addresses associated with secondary storage 114. In response to receiving a file request from an application, the operating system 106 in conjunction with file system 108 may be configured to cause blocks of data corresponding to the request to be transferred from secondary storage 114 to main memory 102.

As used herein, the term "block" of data will be used to describe a set of data that may be read from secondary storage 114. The set of data is intended to be broadly construed and should include any size or format of data. For example, in one embodiment a block of data is a set of data encompassing 4k bytes. In other embodiments, a block of data may encompass other quantities of data.

Figure 2:
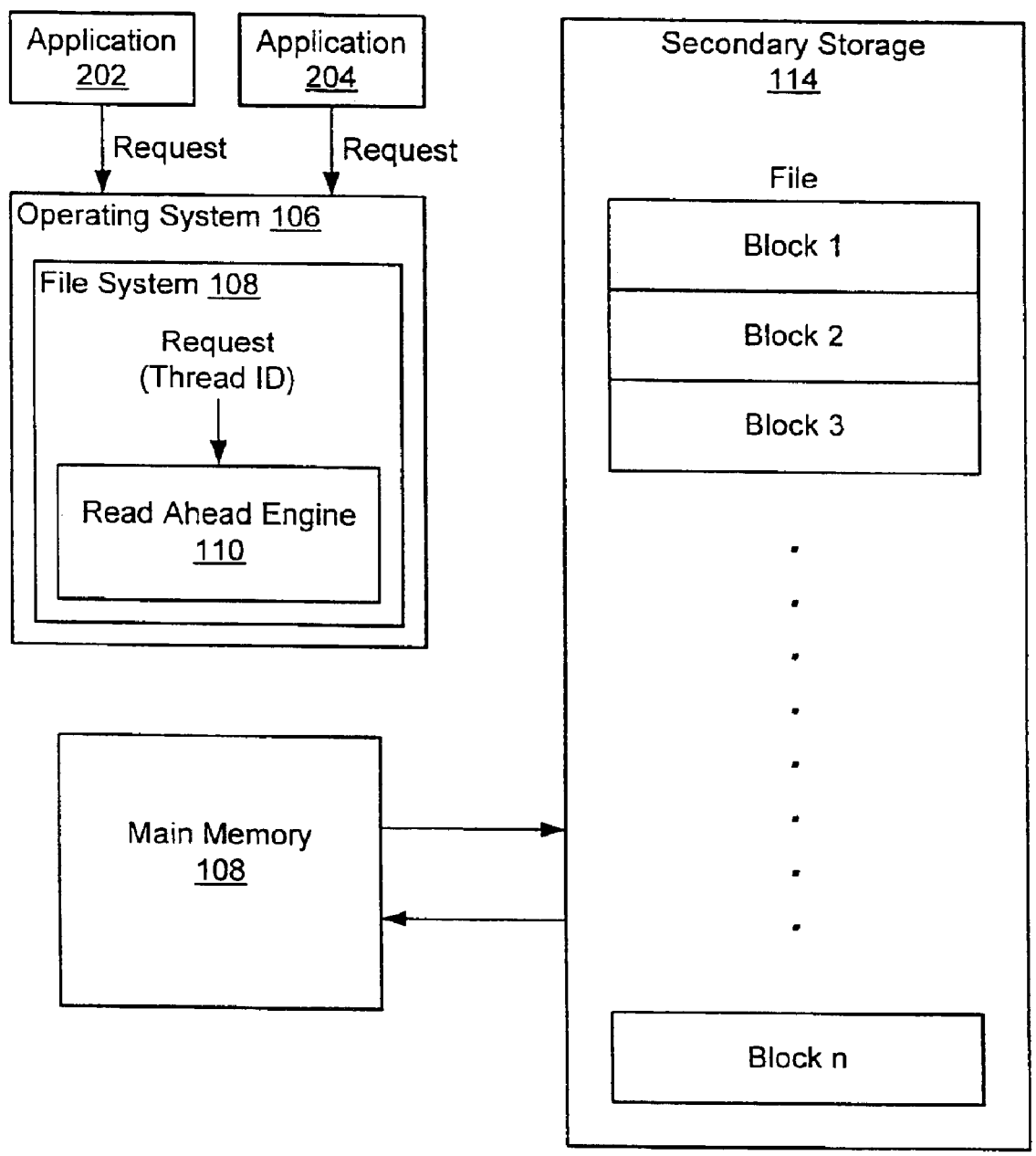
FIG. 2 illustrates main memory coupled to secondary storage according to one embodiment.

In one embodiment, operating system 106 is a multi-threaded operating system that processes tasks according to multiple threads of execution. During operation, operating system 106 may receive file requests from various applications, such as applications 202 and 204 as illustrated in FIG. 2. In response to receiving the file requests, operating system 106 may cause corresponding blocks of the file (e.g., file 206 of FIG. 2) to be transferred from secondary storage 114 to main memory 102, if the blocks do not already reside in main memory 102. As stated previously, to perform this functionality operating system 106 may access directory information within file system 108 to determine the locations of the needed blocks within secondary storage 114.

As will be described in further detail below, indications of the file requests are additionally provided to read ahead engine 110. In various embodiments, a thread ID indicative of the particular thread to which each request corresponds may additionally be provided to read ahead engine 110. Read ahead engine 110 is configured to detect certain patterns associated with these file requests and, in response to detection of such patterns, to cause the prefetching of blocks from secondary storage 114 into main memory 102. Specific details regarding these prefetching operations are provided below.

Figure 3A:
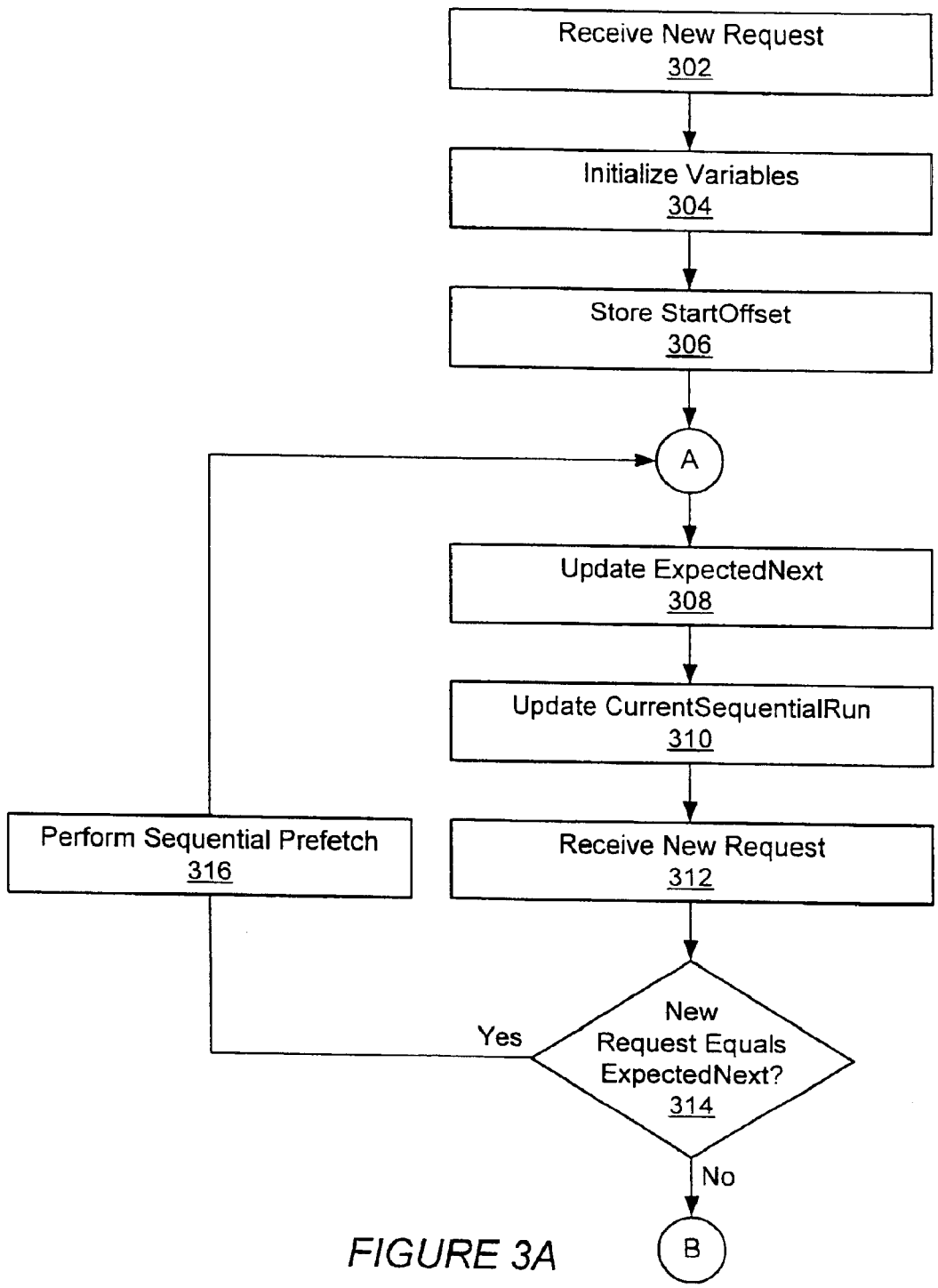
FIGS. 3A and 3B are a flowchart depicting operations of a read ahead algorithm.
Figure 3B:
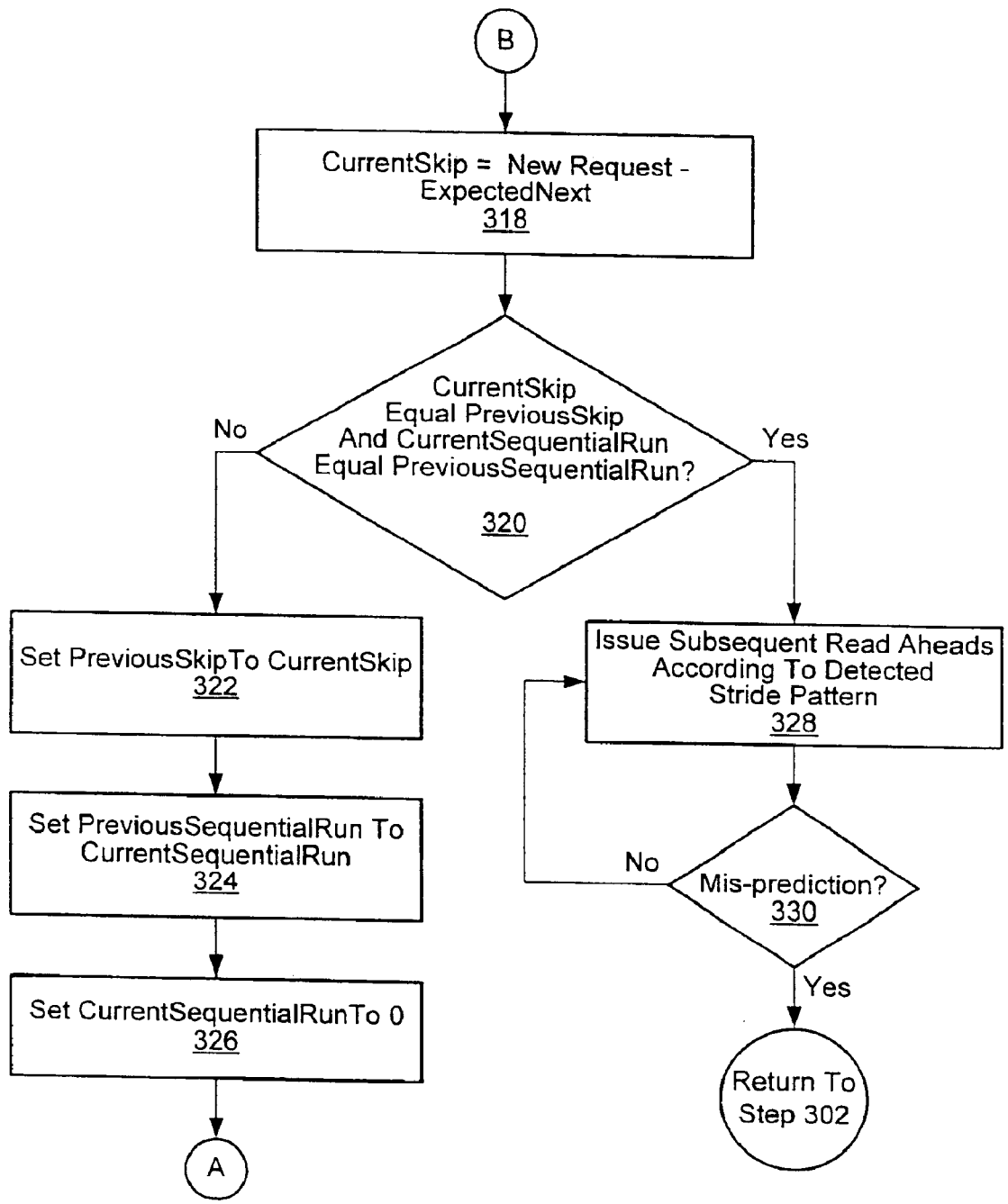

FIGS. 3A and 3B illustrate a flowchart depicting specific operations of a read ahead algorithm implemented in accordance with one embodiment of read-ahead engine 110. It is noted that in embodiments that employ multi-threaded operating systems, read ahead engine 110 may perform the operations depicted in FIGS. 3A and 3B separately and independently for each of several threads for which requests are being processed. As stated previously, indications of file requests received by read ahead engine 110 may include a thread ID to identify the particular thread to which a given request corresponds. The following description of the read ahead algorithm depicted in FIGS. 3A and 3B assumes each new request corresponds to the same thread ID.

In step 302, a new file request 302 corresponding to a particular thread is received. In step 304, various variables utilized by the algorithm may be initialized. Such variables may include START OFFSET, CURRENT SEQUENTIAL RUN, PREVIOUS SEQUENTIAL RUN, EXPECTED NEXT, CURRENT SKIP and PREVIOUS SKIP, as discussed below. In one implementation, these variables are initialized to 0, although such initialization may vary depending upon the implementation.

In step 306, a START OFFSET value for the new request is stored. START OFFSET maintains the starting offset location of the block (or blocks) within a file that is being requested pursuant to the initial request received in step 302.

An EXPECTED NEXT value is then assigned in step 308 with the assumption that the next block requested will be to a sequential location. Therefore, the EXPECTED NEXT value maintains a value indicative of the starting location of a current read location plus the size of the new request. A CURRENT SEQUENTIAL RUN value is also updated in step 310 by incrementing its current value (initialized to 0) by an amount corresponding to the size of the current request. After a subsequent new request is received in step 312, the read ahead algorithm performs a check in step 314 to determine whether the starting location of the new request equals the EXPECTED NEXT value. If the starting location of the new request matches the EXPECTED NEXT value, a sequential prefetch is performed in step 316. This sequential prefetch is performed since, at this point, the last two requests form sequential accesses. Steps 308, 310, 312 and 316 repeat, until a new request is received that does not match the EXPECTED NEXT value. It is noted that this condition will occur when a new request to a non-sequential block is received (i.e., a request that discontinues the sequential access pattern).

If a new request is received that does not correspond to the EXPECTED NEXT value as determined in step 314, a CURRENT SKIP value, in step 318, is recorded that corresponds to the value of the starting location of the current request minus the EXPECTED NEXT value. In step 320, a check is performed to determine whether the CURRENT SKIP value matches, the PREVIOUS SKIP value and the CURRENT SEQUENTIAL RUN matches the PREVIOUS SEQUENTIAL RUN. It is noted that upon the first iteration of the algorithm, PREVIOUS SKIP is initialized to 0 and therefore, step 322 will be performed. In step 322, the PREVIOUS SKIP value is recorded as the CURRENT SKIP value. In step 324, the PREVIOUS SEQUENTIAL RUN value is recorded as the CURRENT SEQUENTIAL RUN value, and in step 326 the CURRENT SEQUENTIAL RUN value is reset to 0.

Therefore, at this point in the read ahead algorithm of FIGS. 3A and 3B, a value (PREVIOUS SEQUENTIAL RUN) indicative of the length of a previous set of sequential accesses is maintained, along with another value (PREVIOUS SKIP) indicative of a non-contiguous skip to the starting address of a new request. The read ahead algorithm continues by determining whether the length of a subsequent SEQUENTIAL RUN and the size of a subsequent corresponding SKIP is the same.

More particularly, following step 316, the algorithm returns to step 308, in which the EXPECTED NEXT value is again updated to correspond to the location sequential to the most recent request. In addition, and similar to the foregoing, the CURRENT SEQUENT RUN value is incremented beginning at 0 according to the size of the current request. A new request is received in step 312, and for as long as the new requests are sequential, the operations of steps 316, 308, 310 and 312 repeat. When a new request is received in step 312 that is not sequential, as determined in step 314, the CURRENT SKIP value is set in step 318 to a value that corresponds to the starting location of a current request minus the expected next value. In step 320, if the CURRENT SKIP value matches the PREVIOUS SKIP value and the PREVIOUS SEQUENTIAL RUN value matches the CURRENT SEQUENTIAL RUN value, a stride pattern is detected. Read ahead requests, in step 328, may subsequently be issued in accordance with the detected stride pattern. This stride based prefetching may be performed until a mis-prediction occurs in step 330 due to an I/O outside of the pattern (i.e., a file request that is inconsistent with the detected stride pattern). At this point, the prefetching of blocks based on the detected stride pattern may be discontinued, and the entire read ahead algorithm is repeated by treating the file request that resulted in the misprediction as a new request in step 302.

Figure 4:
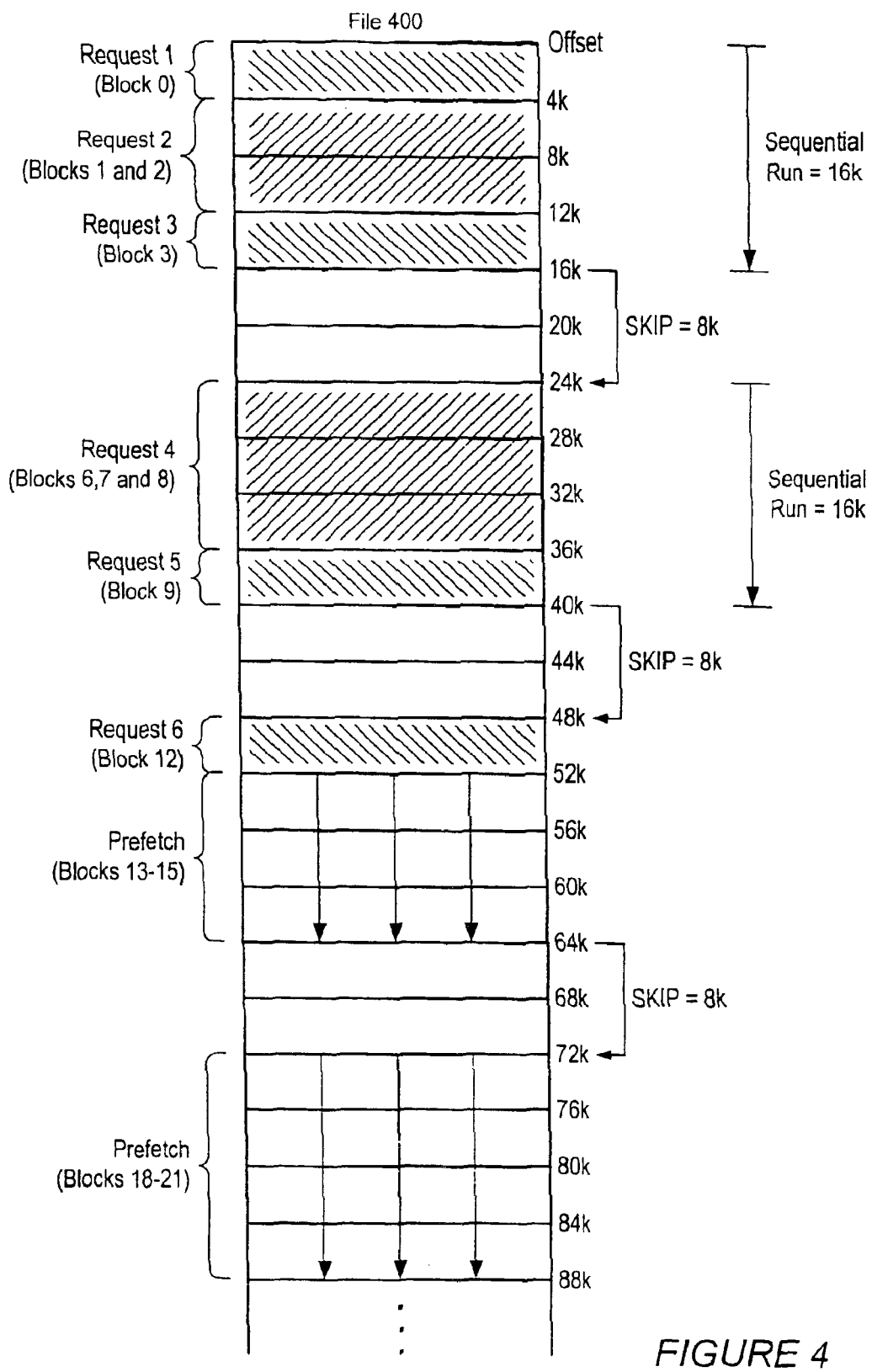
FIG. 4 illustrates an exemplary sequence of reads including a positive skip.

As an example, consider a situation in which a particular thread issues the following sequence of reads:

Request 1 Offset=0, size=4k
Request 2 Offset=4k, size=8k
Request 3 Offset=12k, size=4k
Request 4 Offset=24k, size=12k
Request 5 Offset=36k, size=4k
Request 6 Offset=48k, size=4k FIG. 4 illustrates the above sequence of reads, and the resulting pattern. Each 4k quantity is designated as a block in the drawing for ease of explanation, although it is noted that other block sizes may be defined. As depicted, the sequence of reads includes a sub-sequence of reads at offsets 0, 4k and 12k forming a sequential run of 16k, followed by a skip of 8k, and then another of sub-sequence of reads at offsets 24k and 36k forming another sequential run of 16k, and another skip of 8k.

In accordance with the read ahead algorithm of FIGS. 3A and 3B, the first subsequence of reads (Requests 1, 2 and 3) will cause steps 308, 310, 312 and 316 to be iteratively performed until the variable CURRENT SEQUENTIAL RUN reaches a value indicative of a sequential run of 16k. It is noted that sequential prefetches may be performed during step 316 upon receiving Requests 2 and 3. When Request 4 is received, since it corresponds to a non-sequential starting offset, a value indicating an 8k skip is recorded as CURRENT SKIP in step 318. Prior to returning to step 308 (to initiate the process of recording the length of the second sub-sequence of reads), the values maintained by the variables CURRENT SKIP and CURRENT SEQUENTIAL RUN are recorded as PREVIOUS SKIP and PREVIOUS SEQUENTIAL RUN, respectively, in steps 322 and 324. In response to receipt of Requests 4 and 5, steps 308, 310, 312 and 316 are iteratively performed until the variable CURRENT SEQUENTIAL RUN again reaches a value indicative of a sequential run of 16k. When Request 6 is received, the CURRENT SKIP variable is again set to a value indicating an 8k skip.

In accordance with this example, when Request 6 is received, it will be determined in step 320 that the sequential run formed by the first sub-sequence of reads equals the sequential run of the second sub-sequence of reads (e.g., CURRENT SEQUENTIAL RUN=PREVIOUS SEQUENTIAL RUN). It will also be determined that the skip following each sub-sequence is the same (e.g., CURRENT SKIP=PREVIOUS SKIP). A stride pattern is therefore indicated, and one or more read ahead operations according to the detected stride pattern are initiated in step 328. In this example, read aheads may be issued to prefetch blocks 13, 14 and 15 (to form another sequential run of 16k) and blocks 18–21 (to form a skip of 8k and another sequential run of 16k), and so on, until a request corresponding to the thread falls outside of the predicted pattern.

It is noted that the amount of sequential data (or number of sequential blocks) prefetched in step 316 may vary, as desired. Similarly, the extent of data prefetched according to a detected stride pattern in step 328 may similarly vary. The scheduling of additional read ahead operations may be performed as blocks that have already been prefetched are consumed. The Start Offset value may be utilized to determine the specific blocks to be prefetched.

In one embodiment, when a sequential or stride pattern is detected, the size of the resulting prefetch operations may be set relatively high with the assumption that the pattern will remain and that there is sufficient memory in main memory 108 to accommodate the prefetched blocks. In one implementation, an adaptive algorithm is utilized to reduce the size of the prefetch operations in response to detecting that prefetched blocks are being deallocated from main memory 108 by the system (e.g., such as a paging mechanism), thus resulting in unexpected reads. Accordingly, the amount of read ahead may be adaptively adjusted depending upon the intensity of occurrences of unexpected reads.

Figure 5:
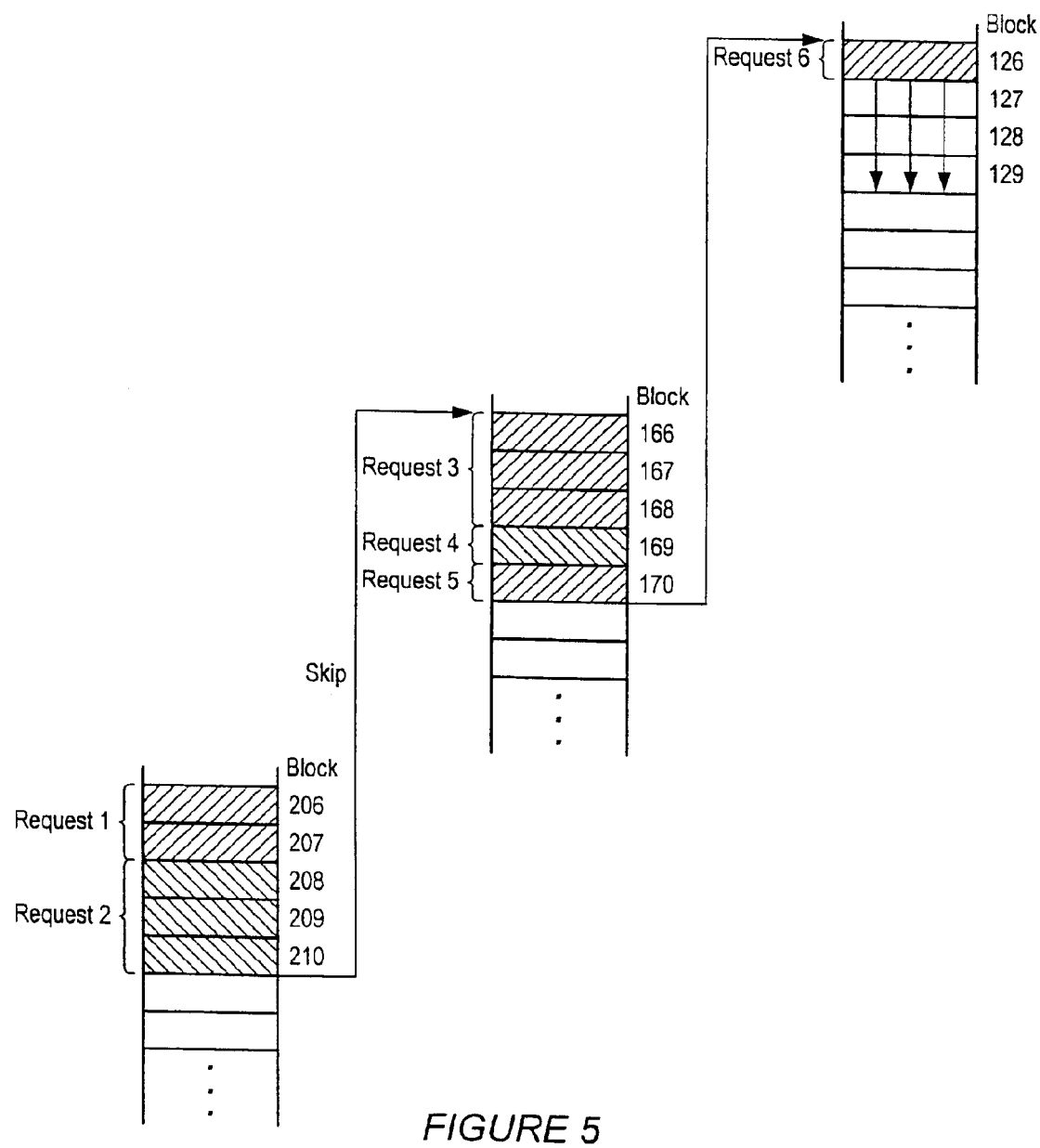
FIG. 5 illustrates another exemplary sequence of reads including a negative skip.

FIG. 5 illustrates another exemplary sequence of reads. In this example, a first sub-sequence of reads (Requests 1 and 2) forms a sequential run of 5 blocks beginning with block 206 Request 3 is then received with a starting offset corresponding to the start of block 166. The skip associated with this sequential request is therefore negative. A second sub-sequence of reads (e.g., Requests 3, 4 and 5) then forms another equal sequential run (i.e., of 5 blocks), and another equal negative skip occurs with receipt of Request 6 that begins at block 126. In accordance with the read ahead algorithm of FIGS. 3A and 3B, a stride pattern (this time in a negative direction) is therefore indicated, and prefetching may be performed according to the detected pattern.

In addition to the foregoing examples, it is also noted that the read ahead algorithm of FIGS. 3A and 3B may also indicate a stride pattern in situations where a set of reads include negative skips that form overlapping consecutive sequential runs. In addition, the read ahead algorithm of FIGS. 3A and 3B may also indicate an occurrence of a stride pattern in situations where consecutive requests are received that each have an equal size and where equal skips exist between each of the consecutive requests.

It is also noted that in various embodiments, a read ahead algorithm similar to that of FIGS. 3A and 3B may be provided that operates on fixed length requests, rather than on variable length requests. In such embodiments, the specific manner in which sequential run lengths of subsequences of requests are calculated may vary from the specific operations illustrated in FIGS. 3A and 3B. Similarly, it is also noted that in other embodiments, a read ahead algorithm similar to that of FIGS. 3A and 3B may be utilized within single threaded systems.

In one implementation, the read ahead engine 110 as described above is implemented in software code (stored in memory such as main memory 102) and incorporated within the file system of an operating system. The software code may include program instructions executable by CPU 104. In other embodiments, the read ahead engine may be provided independent of an operating system and/or file system. In addition, in other embodiments, operations of read ahead engine 110 may be performed in hardware.

Various embodiments may further include receiving, sending or storing instructions and/or data that implement a read ahead engine in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method comprising:
storing a first run value indicative of a first sequential run size of a first plurality of read requests;
storing a first skip value indicative of an extent of a non-sequential skip associated with a subsequent read request;
determining whether a second run value indicative of a second sequential run size of a second plurality of read requests equals the first run value; and
determining whether a second skip value indicative of an extent of another non-sequential skip associated with an additional read request equals the first skip value.

2. The method of claim 1 further comprising performing a stride based prefetch operation in response to determining that the second run value equals the first run value and that the second skip value equals the first skip value.

3. The method of claim 2, further comprising:
modifying the size of the prefetch operation in response to a detection of a condition.

4. The method of claim 3, wherein, in modifying the size of the prefetch operation, the size of the subsequent prefetch operation is reduced.

5. The method of claim 3, wherein the condition is an occurrence of an unexpected read.

6. The method of claim 3, wherein the condition is a deallocation of a prefetched block.

7. The method of claim 1 wherein each of the first plurality of read requests has a variable length.

8. The method of claim 1 wherein the first run value is incremented in response to receipt of each of said first plurality of read requests.

9. The method of claim 1 further comprising determining that the subsequent read request is non-sequential with respect to said first plurality of read requests.

10. The method of claim 1 further comprising receiving a thread ID associated with each of the plurality of read requests to disambiguate requests of a given thread from requests of other threads.

11. A computer system composing:
a microprocessor;
a memory coupled to the microprocessor, the memory including program instructions executable to implement the method of:
storing a first run value indicative of a first sequential run size of a first plurality of read requests;
storing a first skip value indicative of an extent of a non-sequential skip associated with a subsequent read request;
determining whether a second run value indicative of a second sequential run size of a second plurality of read requests equals the first run value; and
determining whether a second skip value indicative of an extent of another non-sequential skip associated with an additional read request equals the first skip value.

12. The computer system of claim 11 wherein the method further includes performing a stride based prefetch operation in response to determining that the second run value equals the first run value and that the second skip value equals the first skip value.

13. The computer system of claim 12 wherein the prefetch operation includes prefetching a block of data from a secondary memory to a main memory.

14. The computer system of claim 12, wherein the method further includes modifying the size of the prefetch operation in response to a detection of a condition.

15. The computer system of claim 11 wherein each of the first plurality of read requests has a variable length.

16. The computer system of claim 11 wherein the method further comprises incrementing the first run value in response to receipt of each of said first plurality of read requests.

17. The computer system of claim 11 wherein the method further includes determining that the subsequent read request is non-sequential with respect to said first plurality of read requests.

18. The computer system of claim 11 wherein the method further includes receiving a thread ID associated with each of the plurality of read requests to disambiguate requests of a given thread from requests of other threads.

19. A memory medium comprising program instructions executable to implement the method of:
    storing a first run value indicative of a first sequential run size of a first plurality of read requests;
    storing a first skip value indicative of an extent of a non-sequential skip associated with a subsequent read request;
    determining whether a second run value indicative of a second sequential run size of a second plurality of read requests equals the first run value; and
    determining whether a second skip value indicative of an extent of another non-sequential skip associated with an additional read request equals the first skip value.

20. The memory medium of claim 19 wherein the method further includes performing a stride based prefetch operation in response to determining that the second run value equals the first run value and that the second skip value equals the first skip value.

21. The memory medium of claim 20, wherein the method further includes modifying the size of the prefetch operation in response to a detection of a condition.

22. The memory medium of claim 19 wherein each of the first plurality of read requests has a variable length.

23. The memory medium of claim 19 wherein the method further comprises incrementing the first run value in response to receipt of each of said first plurality of read requests.

24. The memory medium of claim 19 wherein the method further includes determining that the subsequent read request is non-sequential with respect to said first plurality of read requests.

25. The memory medium of claim 19 wherein the method further includes receiving a thread ID associated with each of the plurality of read requests to disambiguate requests of a given thread from requests of other threads.

26. A computer system comprising:
    a memory, and
    a read ahead engine coupled to the memory, wherein the read ahead engine is configured to store a first run value indicative of a first sequential run size of a first plurality of read requests, store a first skip value indicative of an extent of a non-sequential skip associated with a subsequent read request, determine whether a second run value indicative of a second sequential run size of a second plurality of read requests equals the first run value; and determine whether a second skip value indicative of an extent of another non-sequential skip associated with an additional read request equals the first skip value.

27. The computer system of claim 26 wherein the read ahead engine is further configured to perform a stride based prefetch operation in response to determining that the second run value equals the first run value and that the second skip value equals the first skip value.

28. The computer system of claim 27 wherein the read ahead engine is further configured to prefetch a block of data from a secondary memory to a main memory as a result of the prefetch operation.

29. The computer system of claim 27, wherein the read ahead engine is further configured to modify the size of the prefetch operation in response to a detection of a condition.

30. The computer system of claim 26 wherein each of the first plurality of read requests has a variable length.

31. The computer system of claim 26 wherein the read ahead engine is further configured to increment the first run value in response to receipt of each of said first plurality of read requests.

32. The computer system of claim 26 wherein the read ahead engine is further configured to determine that the subsequent mad request is non-sequential with respect to said first plurality of read requests.

33. The computer system of claim 26 wherein the read ahead engine is further configured to receive a thread ID associated with each of the plurality of read requests to disambiguate requests of a given thread from requests of other threads.

34. A method comprising:
    receiving a first plurality of sequential read requests;
    storing a first sequential run value indicative of a length of the first plurality of sequential read requests;
    receiving a first non-sequential read request;
    storing a first skip value indicative of a difference between a location of the first non-sequential read request and a location that is sequential to the first plurality of sequential read requests;
    receiving a second plurality of sequential read requests;
    storing a second sequential run value indicative of a length of the second plurality of sequential read requests;
    receiving a second non-sequential read request;
    storing a second skip value indicative of a difference between a location of the second non-sequential read request and a location that is sequential to the second plurality of sequential read requests;
    detecting that a stride pattern exists in response to comparing the first sequential run value with the second sequential run value and comparing the first skip value with the second skip value.

35. The method of claim 34, further comprising determining that the first plurality of sequential read requests form a sequential pattern.

36. The method of claim 35, further comprising prefetching one or more blocks of data in response to determining that the first plurality of sequential read requests form a sequential pattern.

37. The method of claim 34, wherein the first sequential run value is incremented in response to receipt of each new read request of the fist plurality of sequential read requests to indicate an overall size of the first plurality of sequential read requests.

38. The method of claim 37, wherein the second sequential run value is incremented in response to receipt of each new read request of the second plurality of sequential read requests to indicate an overall size of the second plurality of sequential read requests.

39. The method of claim 34, wherein the size of each read request of the first plurality of read requests is of a variable length.

40. The method of claim 34, wherein the size of each read request of the first plurality of read requests is of a fixed length.

41. A computer system comprising:
  a microprocessor; and
  a memory coupled to the microprocessor, the memory including program instructions executable to implement the method of:
    receiving a first plurality of sequential read requests;
    storing a first sequential run value indicative of a length of the first plurality of sequential read requests;
    receiving a first non-sequential read request;
    storing a first skip value indicative of a difference between a location of the first non-sequential read request and a location that is sequential to the first plurality of sequential read requests;
    receiving a second plurality of sequential read requests;
    storing a second sequential run value indicative of a length of the second plurality of sequential read requests;
    receiving a second non-sequential read request;
    storing a second skip value indicative of a difference between a location of the second non-sequential read request and a location that is sequential to the second plurality of sequential read requests;
    detecting that a stride pattern exists in response to comparing the first sequential run value with the second sequential run value and comparing the first skip value with the second skip value.

42. A system comprising:
  means for storing a first run value indicative of a first sequential run size of a first plurality of read requests;
  means for storing a first skip value indicative of an extent of a non-sequential skip associated with a subsequent read request;
  means for determining whether a second run value indicative of a second sequential run size of a second plurality of read requests equals the first run value; and
  means for determining whether a second skip value indicative of an extent of another non-sequential skip associated with an additional read request equals the first skip value.

* * * * *